UNITED STATES PATENT OFFICE 2,113,054

ANTHRAQUINONE DERIVATIVES

Frank Lodge, Blackley, Manchester, England, assignor to Imperial Chemical Industries Limited, a corporation of Great Britain No Drawing. Application June 23, 1937, Serial No. 150,011. In Great Britain July 1, 1936

4 Claims. (Cl. 260—59)

According to this invention I make new anthraquinone dyestuffs, namely, disulphonic acids and soluble salts of disulphonic acids of 1-amino-2-aryloxy-4-arylaminoanthraquinones of the general formula

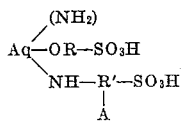

wherein Aq stands for an anthraquinone group, R stands for a phenylene or naphthalene radical, R' stands for a radical of the benzene series, and A stands for a long chain alkyl or alkoxy radical containing from 8 to 20 carbon atoms, by reacting the corresponding 2-bromo-, -chloro- or -sulpho-1-amino-4-arylamino- or -sulphoarylamino-anthraquinone with a phenol or naphthol and then sulphonating the resulting product.

The dyestuffs may carry simple monovalent substituents such as chlorine, bromine, methyl and hydroxy groups in the aryl group of the arylamino or aryloxy radicals, or in the anthraquinone nucleus itself. These simple substituted compounds may be prepared by using the corresponding substituted starting materials.

The preparation of these compounds may be conveniently effected by heating the 2-bromo-, -chloro-, or sulphoarylamino-anthraquinone with an alkali metal salt of phenol or naphthol, in an excess of the phenol or naphthol. Sulphonation may be effected by dissolving the product in 100% sulphuric acid and adding oleum. This converts both ethers and their monosulphonic acid to the disulphonic acids. Sulphonation may also be effected with chloro-sulphonic acid.

The new dyestuffs dye wool and other animal fibers from neutral or slightly acid baths, preferably with the addition of a dyeing assistant, such as cetyl sodium sulphate or Glauber's salt, in bright blue, especially reddish blue shades, which have very good fastness to light, milling and severe washing. The fastness to milling and severe washing is greater than with dyeings of corresponding dyestuffs which lack the alkyl or alkoxyl chain (see British Patent 26,944 of 1911) and as far as I am aware no other reddish blue dyestuffs having the same very good fastness properties are available.

The aminoarylaminoanthraquinones substituted in the 2-position, used as starting materials, may be made by the processes of British Patents 443,776 and 449,011.

The following examples, in which parts are by weight, illustrate but do not limit the invention.

Example 1

56 parts of 2-bromo-1-amino-4-p-dodecylanilinoanthraquinone, 10 parts of powdered sodium hydroxide and 300 parts of phenol are heated together at 170–175° C. for 4 hours. The mixture is then cooled to 80° C. and poured into 2000 parts of 5% aqueous sodium hydroxide solution. The precipitated phenoxy compound is filtered off, washed well with cold water and dried at 50° C.

50 parts of the resulting 1-amino-4-p-dodecylanilino-2-phenoxyanthraquinone are dissolved at 20–25° C. in 500 parts of 100% sulphuric acid, 150 parts of 20% oleum are added and the mixture is stirred until a test portion is completely soluble in cold water, poured on to 2000 parts of ice water and filtered. The filter cake is dissolved in 3000 parts of water at 80° C. neutralized with sodium carbonate and the dyestuff is precipitated with 300 parts of sodium chloride. It is filtered cold, washed with 5% sodium chloride solution and dried at 80° C.

The new dyestuff, 1-amino-4-p-dodecylanilino-2-phenoxyanthraquinonedisulphonic acid (sodium salt), is a violet-blue substance which dissolves in concentrated sulphonic acid with a reddish violet color, and also dissolves readily in water to give clear blue solutions which froth easily. The dyestuff dyes wool in bright reddish blue shades of very good fastness to milling, severe washing and light.

Example 2

70 parts of 2-bromo-1-amino-4-p-dodecylanilinoanthraquinonesulphonic acid (sodium salt), 10 parts of powdered sodium hydroxide and 350 parts of phenol are heated together at 170–175° C. for 6 hours. The reaction mixture is poured, at 80° C., into 250 parts of 5% aqueous sodium hydroxide solution and the precipitated phenoxy compound filtered off, washed with cold water, and dried at 80–100° C.

50 parts of the resulting 1-amino-4-p-dodecylanilino-2-phenoxyanthraquinonemonosulphonic acid are dissolved at 15–20° C. in 500 parts of 100% sulphuric acid and 100 parts of 20% oleum are added. After a few minutes, the sulphonation mixture is poured into 2000 parts of ice water, the product is filtered off and the filter cake neutralized in 3000 parts of water with sodium carbonate. The dyestuff is then precipitated at 70° C. with 300 parts of sodium chloride, cooled, filtered, and dried at 80° C. The dyestuff is the same as that of Example 1.

Example 3

50 parts of 2-bromo-1-amino-4-p-cetylinino-anthraquinonesulphonic acid (sodium salt), 300 parts of phenol and 8 parts of powdered sodium hydroxide are stirred together and heated at 175° C. for 6 hours. The resulting mixture is poured at 50° C. into 3000 parts of 5% aqueous sodium hydroxide solution, filtered, washed with hot water and dried at 100° C.

50 parts of the so-obtained 1-amino-4-p-cetylanilino-2-phenoxyanthraquinonesulphonic acid (sodium salt) are dissolved in 300 parts of 100% sulphuric acid and 60 parts of oleum (20% SO₃) are added at room temperature. After stirring for 15 minutes the mixture is poured into a mixture of 500 parts of ice and 500 parts of water, filtered, neutralized in 2000 parts of water with sodium hydroxide and the dyestuff is precipitated by the addition of 100 parts of sodium chloride, filtered cold, washed with 2% sodium chloride solution and dried.

The new dyestuff, 1-amino-4-p-cetylanilino-2-phenoxyanthraquinonedisulphonic acid (sodium salt), is a violet-blue powder, soluble in concentrated sulphuric acid with a reddish violet color and in water to a reddish blue frothy solution. Wool is dyed in reddish blue shades of very good fastness to severe washing, milling and light.

If instead of the starting material, the corresponding decyl derivative is used, then a similar dyestuff, dyeing in reddish blue shades of very good fastness to light, milling and severe washing, is obtained.

Example 4

33 parts of 2-bromo-1-amino-4-p-dodecylanilinoanthraquinonesulphonic acid (sodium salt), 150 parts of the monoethyl ether of ethylene glycol, 9 parts of p-cresol and 4 parts of powdered potassium hydroxide are stirred at 135–140° C. for 24 hours. The mixture is poured into 1200 parts of cold water containing 30 parts of sodium chloride, heated to 80° C., decanted from liquor, washed with cold water, and dried at 100° C.

30 parts of the so-obtained 1-amino-4-p-dodecylanilino-2-p-cresoxyanthraquinonesulphonic acid are dissolved in 300 parts of 100% sulphuric acid at 20° C. and 50 parts of oleum (20% SO₃) are added. After 15 minutes' stirring at 25° C. the mixture is poured into 450 parts of ice, mixed with 450 parts of water, filtered, neutralized with sodium hydroxide in 2000 parts of water, and the dyestuff is again precipitated with sodium chloride. It is filtered cold, washed with 2% sodium chloride solution and dried at 100° C.

The new dyestuff, which is the disulphonic acid, is a violet-blue powder, soluble in water to a reddish blue solution and dyeing wool from a neutral or acid bath in reddish blue shades of very good fastness to light, severe washing and milling.

If in the above example an equivalent amount of β-naphthol is used instead of p-cresol a reddish blue dyestuff is obtained which dyes wool purer shades of blue and possesses similar very good fastness to severe washing and milling.

Further if p-chlorophenol is used instead of p-cresol another similar reddish blue dyestuff is obtained.

Example 5

50 parts of 1-amino-4-p-dodecyloxyanilinoanthraquinone-2-sulphonic acid (sodium salt), 300 parts of phenol and 30 parts of powdered sodium hydroxide are heated together at 175–180° C. for 24 hours. After cooling to 60° C. the mixture is poured into 2000 parts of 5% sodium hydroxide solution, filtered cold, washed with water and dried.

30 parts of the product, 1-amino-4-p-dodecyloxyanilino-2-phenoxyanthraquinone are dissolved in 300 parts of chloroform at 50° C. and 75 parts of chlorosulphonic acid are added with stirring at 20–30° C. After diluting with 1000 parts of mixed ice and water and neutralizing with sodium hydroxide, the chloroform is distilled in steam and the residual dyestuff precipitated with sodium chloride. It is filtered and re-dissolved in 1500 parts of water at 80° C., 15 parts of active carbon are added and the dyestuff is filtered from suspended matter. It is precipitated with sodium chloride, filtered cold and dried at 80° C.

The new dyestuff is a dark blue powder, soluble in concentrated sulphuric acid with a violet color which changes to blue on addition of formaldehyde. Wool is dyed from a neutral or slightly acid bath in reddish blue shades of very good fastness to severe washing, milling and light.

In a similar manner 1-amino-4-p-cetoxyanilinoanthraquinone-2-sulphonic acid may be converted into 1-amino-4-p-cetoxyanilino-2-phenoxyanthraquinonedisulphonic acid, which has similar very attractive tinctorial properties.

Example 6

12.1 parts of 2-bromo-1-amino-4-p-dodecyl-o-toluidinoanthraquinonesulphonic acid (sodium salt), 40 parts of the monoethylether of ethylene glycol, 1.3 parts of potassium hydroxide and 2.5 parts of phenol are heated at 135–140° C. for 18 hours. The mixture is poured into water, filtered cold and the precipitate washed with water, and dried.

10 parts of the dried product are dissolved in 60 parts of 100% sulphuric acid and 13 parts of oleum (20% SO₃) added. After stirring at about 10° C. for 15 minutes the mixture is poured into a mixture of 100 parts of ice and 100 parts of water and filtered. The residue is dissolved in 600 parts of hot water, neutralized with sodium hydroxide, filtered from suspended matter and the dyestuff precipitated from solution by adding sodium chloride. The dyestuff is filtered cold and dried at 80° C.

The so-obtained new dyestuff is a dark blue powder which dissolves in hot water to a reddish blue frothy solution and dyes wool in rather reddish blue shades of very good fastness to light, severe washing and milling.

Having now particularly described and ascertained the nature of my said invention, and in what manner the same is to be performed, I declare that what I claim is:

I claim:

1. As a new article of manufacture the 1-amino-2-aryloxy-4-arylaminoanthraquinonesulphonic acids of the general formula

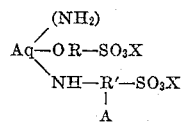

wherein Aq stands for an anthraquinone radical, R stands for a radical of the group consisting of phenylene and naphthalene radicals, R' stands for a radical of the benzene series, and A stands for a long chain aliphatic radical of the class consisting of alkyl and alkoxy radicals which contain from 8 to 20 carbon atoms, and wherein X stands for a substituent of the class consisting of hydrogen and an alkali metal.

2. As new articles of manufacture, compounds of the following general formula

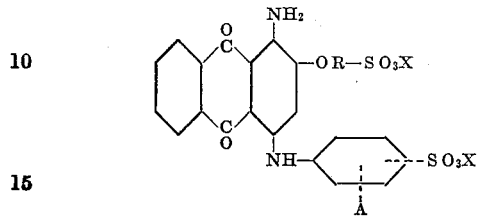

in which R stands for a radical of the group consisting of phenylene and naphthalene radicals, A stands for a long chain aliphatic radical of the class consisting of alkyl and alkoxy radicals which contain from 8 to 20 carbon atoms, and X stands for a substituent of the class consisting of hydrogen and an alkali metal.

3. As a new compound, 1-amino-4-p-dodecyl-anilino-2-phenoxyanthraquinonedisulphonic acid.

4. The process for the manufacture of new anthraquinone dyestuffs which comprises reacting a compound of the class consisting of 1-amino-4-phenylaminoanthraquinone carrying in the 2-position a reactive group of the class consisting of Br, Cl, and $SO_3H$, and their sulphonation products, with a compound of the class consisting of phenols and naphthols, and sulphonating the resulting product.

FRANK LODGE.